2,866,467
REFILL COMPACTS

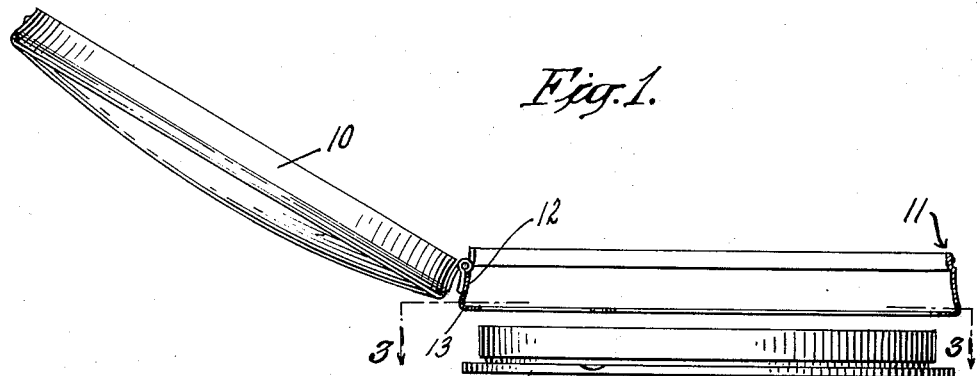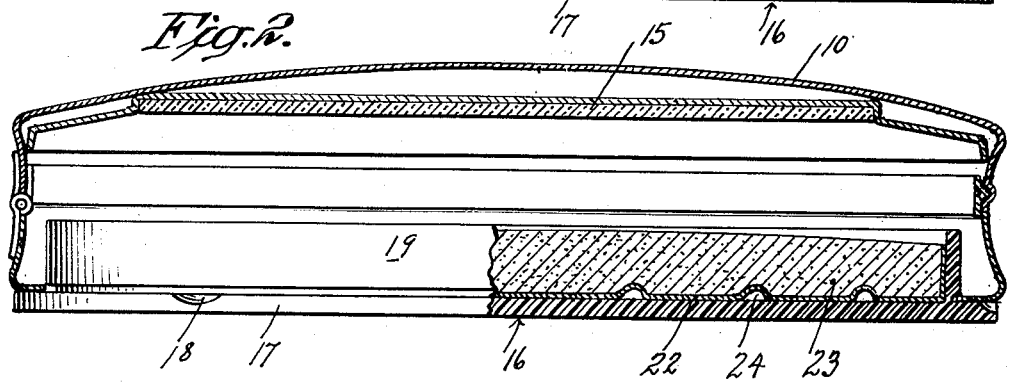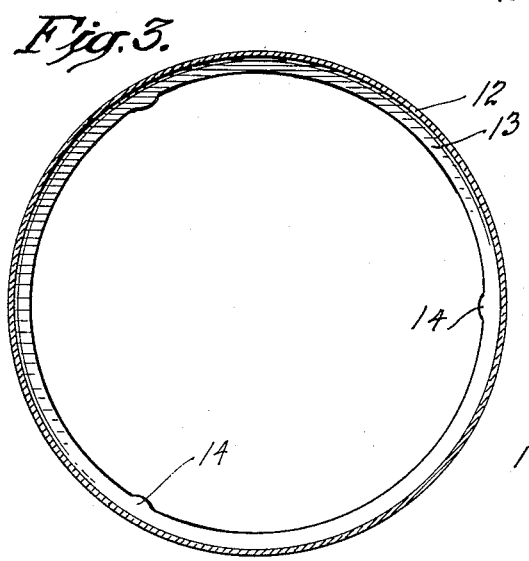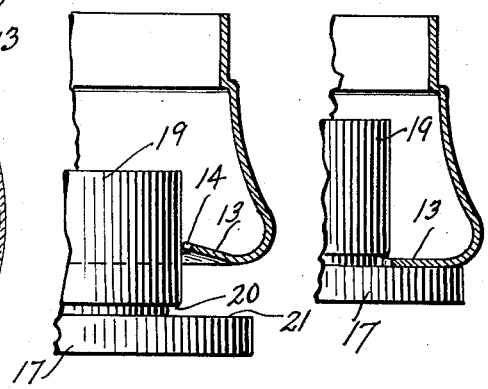

Philip Bradford, Skokie, Ill., assignor to Coty, Inc., New York, N. Y., a corporation of Delaware Application December 10, 1956, Serial No. 627,289

4 Claims. (Cl. 132—82)

This invention relates to compacts or the like and more particularly to a compact enclosing a pressed powder element. As is well known, such an element comprises a cake or block of solid face powder which for many years has found favor with the using public.

Whereas pressed powder compacts have been in wide use for many years, a particular problem has been a means of refilling the compact when the powder is exhausted. The major difficulty has been the brittleness or frangibility of the cake powder when in the form of a refill unit. It is very difficult to handle the unit without cracking the block of powder. Even providing the block with a metal backing does not solve the problem because the cake is very brittle and still extremely subject to cracking when handled. As a result thereof, the unit becomes unsaleable. Accordingly, the product of compacts and their use suffers economically because one generally discards the compact with the exhausted cake powder unit.

With the foregoing in mind, I have devised a compact wherein a cake powder refill unit may be installed therein without requiring any direct handling of the cake powder itself or of its immediate support. On the contrary, the cake powder unit is maintained in a relatively large holder which is adapted to serve as the base or floor of the compact itself. In other words, it is now unnecessary to install the cake powder unit in a compact. It is simply necessary to apply a new base to the compact which base has a cake powder unit permanently affixed thereto. Thus, the user need merely discard the old base when the powder is exhausted and may insert a new base.

A particular advantage of the foregoing is that the compact body may well be made out of more expensive metal while the base may be made out of a plastic material which is cheap but which is hardly noticeable when the device is assembled because the base is only evident as the floor of the compact and may further be recessed within the compact body if desired.

The invention will be further understood from the following description and drawings in which:

Figure 1 is an elevational view of a compact in the open position with the base refill separated therefrom;

Figure 2 is a transverse, longitudinal cross-sectional view of the compact with the base refill unit shown partly in section and partly in elevation;

Figure 3 is a cross-sectional view as taken along the line 3—3 of Figure 1;

Figure 4 is a fragmentary, cross-sectional view illustrating the step of assembling the base refill unit with a compact body; and Figure 5 is a similar view illustrating the completed assembly.

The compact may be of various conventional types, the particular one illustrated being shown as comprising a cover 10 hinged to a body 11. Body 11 is of a form suitable to this invention and comprises a side wall 12 and an integral, annular, inturned flange 13 providing a central opening. The inner periphery of flange 13 may be formed with projections 14 facilitating the assembly of the refill unit as will be hereinafter described. If desired, the compact cover 10 may house usual mirror 15 as shown in Figure 2.

The base refill unit 16 comprises a floor 17 which may have one or more indentations 18 serving as a fingernail or tool accommodating means. Integrally formed on the floor 17 is the annular wall 19 of a diameter somewhat smaller than that of floor 17. Wall 19, in the form shown has a slightly reduced base so as to form an annular groove 20 directly over the floor 17. The over-all reduced diameter of wall 19 relative to floor 17 provides a shoulder 21 on floor 17 upon which the flange 13 normally rests. The wall 19 forms a central well on the floor 17 which receives the pressed powder unit.

Cemented or otherwise secured to floor 17 and embraced by wall 19 is the pressed powder unit comprising the cup-shaped holder 22 within which is fixedly disposed the block of pressed powder 23 and which substantially lines the floor and walls of the well. In the form shown, the holder 22 is of metal and is provided with corrugations 24 which serve as retention means when the powder 23 is molded therein as customary.

The device is used in the following manner:

The initial assembly will generally be made by the manufacturer. The base refill unit 16 having been filled with the pressed powder unit, it is simply snapped into place by introducing the wall 19 into the central opening of body 11. As illustrated in Figure 4, the flange 13 first embraces the periphery of wall 19 and subsequently the projections 14 snap into groove 20 so as to effect the assembly of the device. Of course, other means of effecting such assembly will be obvious since it is not essential that the projections 14 be employed. At this time, the flange 13 will rest flatly on the shoulder 21. The body of the base unit 16 may well be of resilient plastic, while the compact itself may be of metal so as to facilitate the snapping action.

After the powder has been exhausted, the user may simply insert a fingernail or nail file or the like into indentation 18 and pry away the base refill unit. Thereafter she may insert a new refill unit by restoring such unit in the manner above described. At no time need the powder or its holder 22 be handled. In fact, it is almost impossible to reach the holder and considerable abuse will be absorbed before any damage to the pressed powder block is effected. In the form shown the diameter of floor 17 is substantially the same as that of the body 11 so that the refill unit may be easily reached and pryed away from the body.

While I have shown what I believe to be the best embodiments of my invention, it will be apparent to those skilled in the art that many changes and modifications may be made therein without departing from the spirit and scope of the invention as defined in the appended claims.

What is claimed is:

1. A powder compact comprising a body having an open bottom, a removable base unit secured to said compact body and disposed within said body, said removable base unit filling said open bottom, a floor on said base unit, an annular wall formed on said floor and disposed within the compact body, said annular wall forming a well on said floor, a block of solidified face powder disposed in said well when said removable base unit is disposed within said compact body, and a metal holder for said block of powder, said holder being cup-shaped and substantially lining the floor and walls of said well, said body being formed with a lower, inturned annular flange which defines said open bottom, said annular wall being of a diameter less than that of said floor so as to form an upper shoulder on said floor, said flange resting on said upper shoulder.

2. A powder compact according to claim 1 and wherein said wall has a base of reduced diameter so as to form a groove over said floor, said flange being seated in said groove.

3. A powder compact according to claim 2, and including peripheral projections on said flange which are received in said groove by a snap-fit.

4. A powder compact according to claim 3, and wherein said floor is substantially the same diameter as that of said body so that the peripheral edges of said floor are accessible for prying the floor out of said open bottom against the action of said snap-fit.

References Cited in the file of this patent

UNITED STATES PATENTS

| | | |
|---|---|---|
| 697,729 | Lichtenstein | Apr. 15, 1902 |
| 1,451,740 | Miles | Apr. 17, 1923 |
| 1,506,017 | Lusher | Aug. 26, 1924 |
| 1,851,462 | Steller | Mar. 29, 1932 |